UNITED STATES PATENT OFFICE.

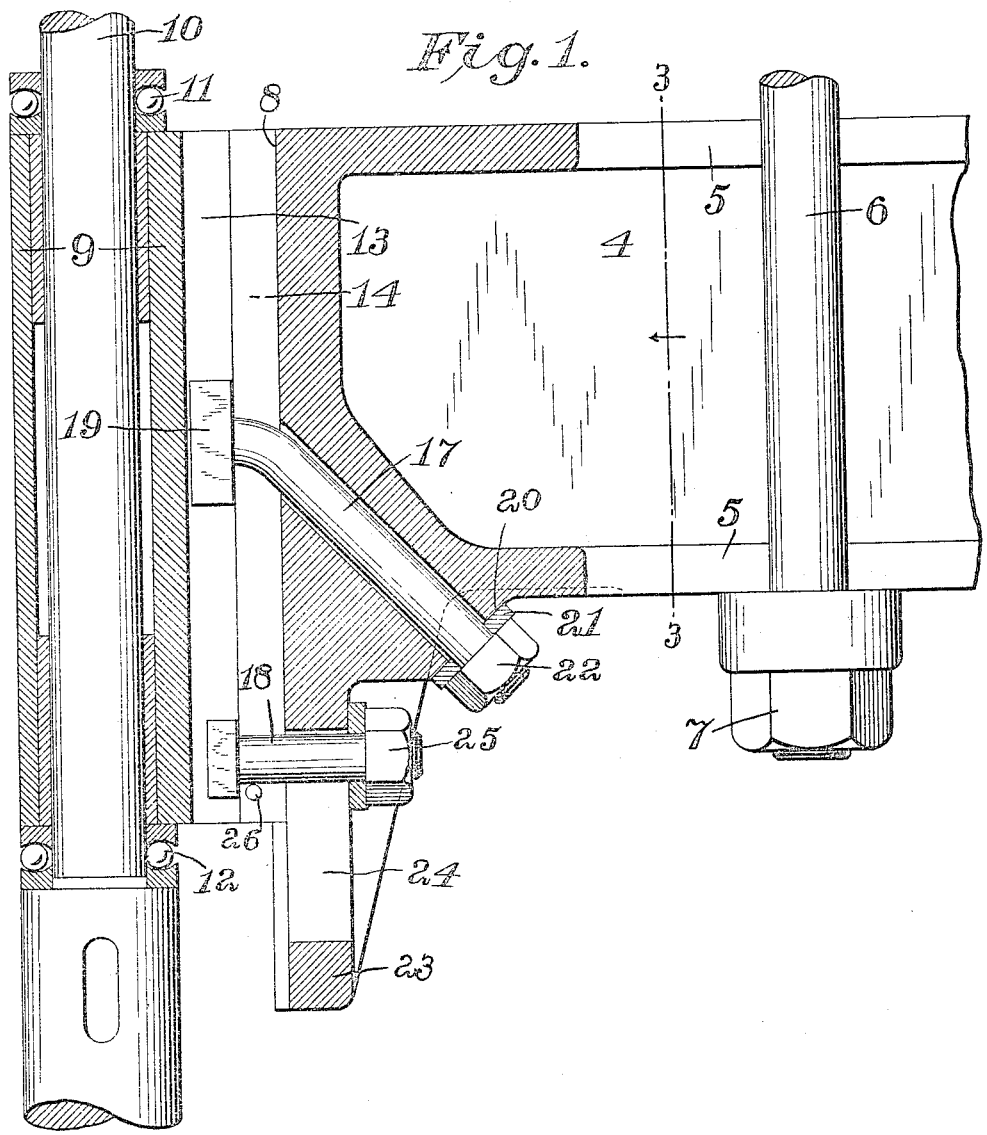

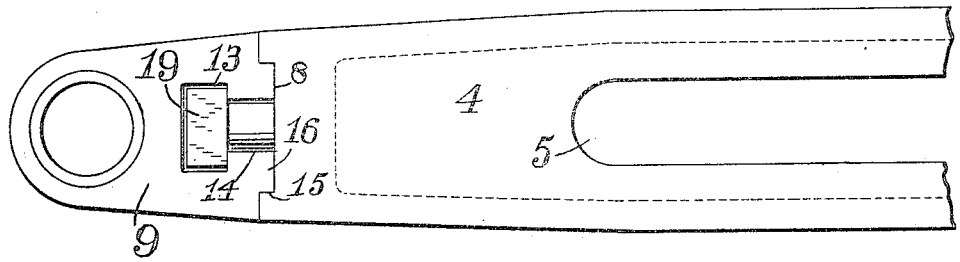
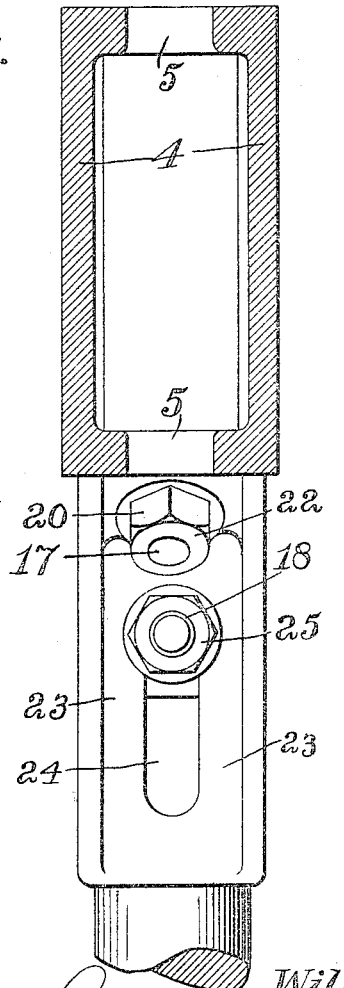

WILLIAM R. FOX AND EDGAR W. CLEVELAND, OF JACKSON, MICHIGAN; SAID CLEVELAND ASSIGNOR TO SAID FOX.

MULTIPLE-SPINDLE DRILLING-MACHINE.

1,225,235.      Specification of Letters Patent.      Patented May 8, 1917.

Application filed October 31, 1916. Serial No. 128,767.

*To all whom it may concern:*

Be it known that we, WILLIAM R. Fox and EDGAR W. CLEVELAND, citizens of the United States, and residents of Jackson, Michigan, have invented certain new and useful Improvements in Multiple-Spindle Drilling-Machines, of which the following is a specification.

One object of the invention is to provide a connection between the spindle bearing and the supporting arm of a multiple spindle drilling machine, which connection will be accessible though located entirely within the vertical plane in which the supporting arm lies, laterally projecting clamping bolts or other fastening means at the side of the supporting arm being avoided and thereby allowing the supporting arms of the multiple drilling machine to be adjusted close together for drilling holes in close proximity, the construction involving, in the specific form herein illustrated, a plurality of clamping bolts arranged at different heights in respect to the arm and bearing but all being readily accessible for adjustment in order to set the spindle bearing at different heights relatively to the arm.

Other objects of the invention will appear from the following description.

The type of head for a multiple drilling machine in which my invention may be embodied may be the same as that disclosed in Letters Patent of the United States, No. 1,082,009, December 23rd, 1913.

In the accompanying drawing

Figure 1 is a vertical sectional view of a part of the supporting arm of a multiple drilling machine, together with the spindle bearing and the clamping connection between the bearing and the arm.

Fig. 2 is a plan view of Fig. 1.

Fig. 3 is a vertical cross sectional view through the arm on the line 3—3 of Fig. 1 looking toward the left.

In these drawings, 4 indicates a supporting arm of a multiple drilling machine having a longitudinal slot 5 through which passes a bolt 6, the upper end of which, as in ordinary practice, is provided with a head seated in the main supporting head of the machine, this bolt having on its lower end a nut 7 by which the arm may be clamped in different positions relative to the supporting head. The arm on its vertical face is provided with a seat at 8 for the bearing 9 of the drill spindle 10, suitable ball bearings being arranged at 11 and 12 at the upper and lower ends of the bearing. The bearing has a vertical channel or way 13, 14, of T shape in cross section and the face of the bearing is formed to fit the seat or face at 8 on the arm, as best shown in Fig. 2, the face of the arm having a guide-way 15 to receive the projecting portion 16 on the face of the bearing.

In order to clamp the bearing to the arm we provide bolts 17 and 18. The bolt 17 is arranged at an inclination to the vertical axis of the spindle bearing and thus inclines upwardly from its lower end, and its upper end is turned or bent and is provided with a head 19 fitted to the channel or way 13 in the bearing, the shank portion of the bolt at its upper end passing through the channel or way 14. The arm 4 is provided with an inclined bearing surface 20 to receive a washer 21 on the bolt and a nut 22 threaded onto the extreme lower end of the bolt bears on this washer.

It will be noticed that the nut is readily accessible, being exposed below the lower side of the supporting arm so that it may be turned with the use of a suitable wrench to tighten the bolt and thus draw it downwardly in its inclined seat in the arm and draw the head 19 into firm clamping contact with the wall of the channel 13 to securely clamp the bearing to the arm. The arm is also provided with a downward extension 23 provided with a vertical slot 24 through which the bolt 18 passes. This bolt extends horizontally and its head lies in the channel 13, and when the nut 25 is set up, the head is drawn against the wall of the channel and a clamping effect is thus secured at this point. The bolt is free to move in the slot 24 vertically and it is maintained in proper relation to the spindle bearing by resting on a pin 26 extending between the walls of the channel 14 of said bearing and thus transversely of and below the bolt 18. It will be noted that both bolts have their adjacent ends with the nuts thereon located below the supporting arm where they are accessible so that either of the bolts may be loosened or tightened by the use of a suitable wrench. The nuts are adjacent each other for convenient access and manipulation and both bolts lie within the vertical plane of the supporting arm, leaving the sides of the supporting arm free from projections of any sort which would interfere with the adjustment of one arm in close proximity to its neighbor, and in order to enable the arms to be adjusted close together they are tapered toward the spindle bearing and this spindle bearing is also tapered or provided with inclined lateral faces, as indicated in Fig. 2.

From the construction described in relation to the arrangement of the bolt 17, it will be understood that upward pressure exerted through the spindle and its bearing vertically will result in the bolt being drawn upwardly and set tighter in its seat because of the inclined disposition of the bolt and the vertical relation of its head with respect to the vertical channel in the spindle, and, therefore, vertical pressure exerted through the spindle and its bearings will result in a tighter clamping action of the bolt in securing the spindle seat to the arm. When the nuts of the two bolts are loosened and the spindle bearing or seat is adjusted downwardly, the lower bolt 18, being free to move in the vertical slot 24 of the arm, will move down with the spindle bearing until it reaches the lower end of the slot 24, or it will be arrested at any intermediate point at which the spindle bearing may be set because, as above stated, the bolt rests on the pin 26 carried by the spindle bearing. The spindle bearing may, of course, be adjusted downwardly as far as the head of the bolt 17, or to such a point that the head 19 will still maintain connection or engagement with the spindle bearing.

The feature of mounting the bolt 18 to move with the spindle bearing and in relation to the main casting enables the spindle bearing to have a wider range of adjustment than would be the case if this bolt 18 were mounted at one fixed point in the main casting, and this wider range of adjustment is secured without the necessity of extending the main casting downward an equal distance.

We claim as our invention:—

1. In combination in a drilling machine, a supporting arm, a spindle bearing vertically adjustable relative thereto, and a plurality of bolts mounted in the arm independently of each other and adjustable independently of each other, one of said bolts having a head to clamp the bearing and with which head the bearing has sliding engagement when said bearing is released, nuts for clamping said bolts independently, both of said nuts being exposed below the lower face of the arm, substantially as described.

2. In combination a supporting arm, a spindle bearing vertically adjustable relative thereto and a plurality of clamping means for the bearing engaging the same at different heights and carried by the arm, one of said clamping means extending at an inclination upwardly in relation to the vertical axis of the spindle bearing, substantially as described.

3. In combination in a drilling machine, a supporting arm, a spindle bearing vertically adjustable relative thereto, and means for clamping the bearing to the arm comprising a bolt extending through the arm at an upward inclination relative to the axis of the bearing, substantially as described.

4. In combination in a drilling machine, a supporting arm, a spindle bearing vertically adjustable relative thereto, and means for clamping the bearing to the arm comprising a bolt extending through the arm at an upward inclination relative to the axis of the bearing, said bolt being accessible for clamping or unclamping the spindle bearing at a point beneath the supporting arm, substantially as described.

5. In combination in a drilling machine, a supporting arm, a spindle bearing vertically adjustable relative thereto, and means for clamping the bearing to the arm comprising a bolt extending through the arm at an upward inclination relative to the axis of the bearing, said bolt having a head set at an acute angle thereto and said bearing having a vertical channel or recess in which said head is located and against the wall of which the head is pressed to clamp the bearing to the arm, substantially as described.

6. In combination in a drilling machine, a supporting arm, a spindle bearing vertically adjustable relative to said arm, a pair of bolts connecting the arm with the bearing, nuts for adjusting said bolts independently, said nuts being accessible at points at the lower part of the arm, one of said bolts extending upwardly and laterally to connect with the spindle bearing, substantially as described.

7. In combination in a drilling machine, a supporting arm, a spindle bearing vertically adjustable relative to said arm, an upper and a lower bolt mounted in the arm and connecting the arm with the spindle bearing, the said upper bolt extending upwardly and laterally and having a clamping head at its upper end with which the spindle bearing has slidable engagement, a nut on the lower end of said upper bolt, the said arm having a bearing against which the upper bolt may rest and a nut for clamping the lower bolt, substantially as described.

8. In combination in a drilling machine, a supporting arm, a spindle bearing vertically adjustable relative thereto and a pair of clamping bolts both accessible at points beneath the arm, said bolts engaging the spindle bearing at different heights and clamping the said bearing to the arm, one of said bolts extending horizontally and the other extending at an inclination relative to the arm and the vertical axis of the spindle bearing, substantially as described.

9. In combination in a drilling machine, a horizontally disposed supporting arm having a downwardly extending portion at its end, a bearing for the spindle of the drill movable vertically in guides at the end of the arm, a bolt extending through the arm at an inclination relative to the axis of the bearing and emerging from the arm substantially at the junction of said downward extension with the arm, a nut on the bolt, said bolt having a head fitted to a vertical way in the spindle bearing and a second bolt extending horizontally through the said extension and having a head engaging the channel or way in the bearing and a nut on said horizontal bolt, substantially as described.

10. In combination in a drilling machine, a supporting arm having a vertical slot, a drill spindle bearing vertically adjustable relative to said arm, a clamping bolt movable vertically with said bearing and extending through the vertical slot in the arm and a clamping bolt extending through a fixed bearing in the arm and engaging the bearing to clamp the same to the arm, said last mentioned bolt maintaining its position against movement up or down relative to the arm in the vertical adjustment of the bearing, substantially as described.

11. In combination a vertically slotted supporting arm, a drill spindle bearing vertically adjustable relative to the arm, a bolt passing through the slot in the arm, adjustable vertically thereof, and having a head engaging the spindle bearing, said spindle bearing having a way or channel receiving said head to permit the bearing to be adjusted vertically relative to said head, means for supporting the bolt in said channel and a second bolt passing through the arm to clamp the spindle bearing thereto.

12. In combination a vertically slotted supporting arm, a drill spindle bearing vertically adjustable relative to the arm, a bolt passing through the slot in the arm and having a head engaging the spindle bearing, said spindle bearing having a way or channel receiving said head, means for supporting the bolt in said channel and a second bolt passing through the arm to clamp the spindle bearing thereto, said supporting means for the bolt first mentioned consisting of a pin in the bearing upon which the bolt rests, substantially as described.

13. In combination in a drilling machine, a supporting arm, a drill spindle bearing vertically adjustable relative to said arm, said arm having a vertical slot, clamping means comprising a bolt passing through said vertical slot and having a head with which the bearing slidably engages, said bolt moving vertically in said slot with the spindle bearing but permitting the spindle bearing to have additional vertical movement when the bolt reaches the lower end of the slot, substantially as described.

14. In combination in a drilling machine, a supporting arm, a drill spindle bearing vertically adjustable relative to said arm, a clamping bolt to hold the bearing at different vertical positions relative to the arm, a second clamping bolt below that first mentioned mounted in the arm to have vertical movement in relation thereto and having a head slidably engaging the bearing to permit said bearing to have movement vertically independent of said bolt, substantially as described.

In testimony whereof, we affix our signatures.

WILLIAM R. FOX.
EDGAR W. CLEVELAND.

Witnesses of signatures:
HOWARD D. CORWIN,
A. A. RIDDELL.

Copies of this patent may be obtained for five cents each, by addressing the "Commissioner of Patents, Washington, D. C."